Patented Aug. 6, 1935

2,010,340

UNITED STATES PATENT OFFICE

2,010,340

PREPARATION FOR MAKING FOOD PRODUCTS AND METHOD OF MAKING THE SAME

Powell Williams, Kansas City, and John D. Waugh, St. Louis, Mo., assignors to Speas Manufacturing Company, Kansas City, Mo., a corporation of Missouri No Drawing. Application December 5, 1932, Serial No. 645,752

14 Claims. (Cl. 99—11)

The present invention relates to pectin preparations for jelly production, and the method of preparing the same.

Among the objects of the invention is to provide a novel pectin preparation which when used to produce a jelly of given soluble solid content, acts to delay or retard the setting of the jelly for one-half hour or more, employs less pectin of given strength than heretofore required for jellies of similar or even less percentages of soluble solid contents, and permits cooking the batch at higher temperatures without injury to the jellifying strength of the pectin used, than previously practicable for jellies using similar or greater pectin strengths and soluble solid contents.

Another object of the invention is to provide a novel method or process of preparing said preparation.

Other objects, advantages, capabilities, features and process steps are comprehended by the invention as will later appear and as are inherently possessed thereby.

Our novel preparation contains pectin, a suitable amount of free organic acid such as citric, tartaric, malic, and the like, a sugar such as corn sugar, and a salt of an alkaline metal and an acid, the acid component of which is stronger than the free acid added to the preparation, such as an alkaline or di-basic acid phosphate such as di-sodium hydrogen phosphate, di-potassium hydrogen phosphate, and the like, having the general formula $M_2HPO_4$ where M represents an alkaline metal, such as sodium potassium, etc.

Pectin jellies suitable as confections and the like, have been produced but such a high strength of pectin was required for the given soluble solid content desired in the final product, that when the batch was cooked and the acid added, the batch immediately set and it was practically impossible to effect the desired handling.

The present invention comprehends the delaying or retarding of the setting action for such a period of time, such as one-half hour or more, as to permit the proper handling of the batch before the setting takes effect. The salt mentioned acts as a check for the purpose stated. It also permits the use, for pectin jellies of given soluble solid content, of less pectin strength than heretofore required. It also permits the use of a larger proportion of sugar to obtain a higher percentage of soluble solid content, than before obtainable for a given strength of pectin. It also permits cooking at higher temperatures than heretofore practical for even greater strength pectin, without injurious effect of the pectin in our preparation.

The following formula is illustrative of the mode of preparing our preparation. It is usual to make up a batch totaling 400 pounds. The components are added in the order given into a suitable mixer and stirrer which is continually running to thoroughly stir and mix the ingredients to effect an homogeneous mass.

(1) 271# dry fine granulated corn sugar,
(2) 100# No. 100 grade dry powdered pectin,
(3) 18# di-sodium hydrogen phosphate in dry powdered form or exicated to U. S. P. No. X standard, and
(4) 11# edible dry powdered organic acid, such as citric, tartaric, or malic.

The sugar and pectin are first mixed, then the $Na_2HPO_4$ added, and the acid added last, to prevent the acid acting on the sugar (if the acid were earlier added) to produce a gummy or sticky mass. This preparation is stable and remains in dry powdered form for a long period of time after which it may be used with sugar and water, and suitable coloring and flavoring material to produce an end product, such as candies, confections, syrups, icings and the like.

The salt mentioned has a checking action upon the reaction of the acid and the pectin and the other components for making the product, during or at the end of the cooking, thus delaying the setting for a period of about one-half hour or more as desired, depending upon the relation of the salt and the other components of the preparation.

The salt also acts to permit cooking to a higher temperature than before possible for producing a final pectin product having a high percentage of soluble solid content, without injuriously affecting the pectin, and also to permit the use of less pectin strength than heretofore required for making a pectin product with even a smaller percentage of soluble solid content.

Control of the setting time of the final product is effected by varying the salt. Increasing or decreasing the salt respectively increases or decreases the setting time.

In the above example, 18# of the salt, procures a setting of at least 30 minutes; 20#, a delay of slightly over an hour; 14#, a delay of only from 4 to 8 minutes. Above 20#, setting occurs beyond a reasonable time. If more or less than 18# of $Na_2HPO_4$ be used, then to maintain the batch at 400#, it is necessary to either subtract or add a corresponding amount from or to the sugar given in the formula.

Commercial powdered pectin varies in acidity as to batches and method of manufacture. The pectin given in the illustrative formula is of usual or average acidity. The amount of free acid added may be varied accordingly. For example, the amount of citric acid added may vary between 10 and 20 pounds. The balancing or keeping the batch at 400# is done with the sugar. Thus, if 15# of acid are used, the amount of sugar would be reduced by four pounds.

Powdered pectin in commercial form varies in strength according to batches and source, but we try to maintain in the preparation a strength for the 400 pound batch of 10,000 jell units. In other words, every pound of the preparation would contain at least 25 jell units. The usual standard for grading the strength of pectin is the jell unit. A jell unit is that jellifying power which will make a preservers' jelly of such firmness as to stand up without deformation. It may be defined as that jellying power which is produced when one pound of granulated sugar is cooked with pectin, tartaric acid and sufficient distilled water to produce a satisfactory, firm, preservers' jelly having a total soluble solid content of 62½ percent and when the pectin used is 1% of the weight of the sugar used and the tartaric acid used is ⅓% of the weight of the sugar used.

The commercial grades of powdered pectin are usually in the form of numbers, such as No. 100 grade, No. 90 grade, No. 80 grade. The number of the grade indicates the number of jell units per pound of pectin. Thus 1 pound of No. 100 grade pectin contains 100 jell units. Although we have given in our formula the use of No. 100 grade pectin, it is not necessary to use exactly this grade although we find it desirable to do so. If No. 90 grade pectin is used, the amount of pectin in the formula should be 111 pounds in order to bring up the 400 pound batch to 10,000 jell units. Again the balancing is done with the sugar and 11 pounds less sugar is required. If No. 110 grade is used only 90¾ pounds of pectin need be used to secure the 10,000 jell units, but 9¼ pounds of sugar should be added to keep the batch at 400 pounds.

The pectin preparation of our invention, is susceptible of several uses. One of its more important uses is in the making of candies and confections. For example, when making a candy or similar confection with the pectin preparation of our invention, the following is an illustrative formula:—

50 pounds sugar (cane, beet or corn)
50 pounds corn syrup
3 pounds pectin preparation (75 jell units)
30 to 50 pounds of water
Coloring and flavoring material as desired.

The three pounds of the pectin preparation contain the following:

| | Pounds |
|---|---|
| No. 100 grade pectin | 0.75 |
| Na₂HPO₄ | 0.135 |
| Citric acid | 0.0825 |
| Corn sugar | 2.0325 |
| Total | 3.000 |

It will be apparent that this is in exactly the same proportion as in the formula given for the preparation of the 400 pound batch of the preparation.

The above formula results in producing a jelly having 80 percent soluble solid content when the batch is cooked to 17° F. above the boiling point of water at the time and place where the cook is made. To obtain an 85 percent soluble solid content jelly, the batch is cooked to a higher temperature, such as 20° F. above the boiling point referred to above, and similarly to obtain a 75 percent soluble solid content jelly, the batch is cooked to a lower temperature, such as 13° F. above the boiling point mentioned.

In the formula mentioned above, the pectin preparation may be used in the amounts given below to produce the end products as follows:

3# for what is commercially known as a very tender sugar sanded jelly drop;

3½# for what is known commercially as a tender sugar sanded jelly drop;

4# for a center for a commercial crystallized jelly drop or string;

5# for, in the language of the trade, a center for a firm sugar sanded or center for a crystallized jelly drop, or Turkish paste; and 2# to 2½# for fillers for pies, cakes and the like.

The pectin jellies for use as candies or similar confections made with our novel pectin preparation have advantages over the starch jellies now universally used by candy makers. They stand up for a period of over a year without graining or becoming hard and tough. Starch jellies will stand up under similar circumstances for only a few weeks. Further the confections made in accordance with the formula above, are in equilibrium with the atmospheric conditions, thus lengthening their shelf life and maintaining their original condition or state for a long period of time. The pectin candies or confections contain more nutrient and a larger percentage of sugar since the actual pectin contained is less than 1%, while the starch content of the commercial starch jellies is about 8%. Sugar is converted into energy at once, whereas starch jellies must first be changed into sugar in the body. Thus pectin jellies are more rapid energy producers and can be eaten in larger quantities. One part of pectin by weight takes the place of eight parts by weight of starch and it is clear that in a pectin jelly seven parts by weight more of sugar may be used, thus enhancing the energy producing property.

In the manufacture of candies or confections using our novel pectin preparation, many economies and advantages are obtained. Jellies produced using our invention are completed within 24 hours or less, while starch jellies require from two to five days.

Moreover, the cooking time for our pectin preparation candies is less than required for starch jellies. Regulated cooking rules may be followed, such as cooking at a given temperature or to a given soluble solid content percentage. This is not true of starch jellies which are subject to guess work and require an experienced cook to ascertain when the cooking is completed. Further, starch jellies must be placed in a drying room which is not required at all in making candies using our novel pectin preparation. Thus the cost and space required for elaborate drying means, is eliminated by the use of our invention.

The pectin jellies produced using our novel pectin preparation are brilliant and clear while those using starch jellies are dull and cloudy. Candies or confections made using our novel pectin preparation do not string out and stick to the teeth as do the ordinary starch jellies now in commercial use.

While we have disclosed an illustrative embodiment of our invention, a method of producing the same and an illustrative example, it is understood that the invention is not limited thereto, but comprehends other compositions, variations and process steps without departing from the spirit of the invention.

Having thus disclosed the invention, we claim:

1. A process of making a preparation suitable for making jellied candies, confections and the like, comprising mixing pectin with sugar and a salt of an alkaline metal and an acid stronger than the free acid added, said salt being added in a proportion sufficient to delay the setting action of the jelly batch made therewith for thirty minutes or more, and then adding a free edible organic acid.

2. A process of making a preparation suitable for making jellied candies, confections and the like, comprising mixing pectin with sugar in an amount sufficient to produce in the cooked jelly made therewith a soluble solid content of 80% or more, adding a salt of an alkaline metal and an acid stronger than the free acid added, said salt being added in a proportion sufficient to delay the setting action of the jelly batch for thirty minutes or more, and then adding an edible organic acid.

3. A process of preparing a preparation, comprising mixing in suitable proportions to produce a jellied product suitable for making jellied candies and the like having a high percentage of soluble solid content pectin with a sugar, adding thereto and mixing therewith a salt of an alkaline metal and an acid in such proportion as to controllably retard the setting of the preparation, and then adding thereto and mixing therewith an edible organic acid having less strength than the acid component of said salt.

4. A preparation in dry powdered form suitable for use in making a pectin jellied candy and the like having a high percentage of soluble solid content, comprising dry powdered pectin, sugar, a salt of an alkaline metal and an acid stronger than the acid added in dry powdered form, and an edible organic acid in dry powdered form, said salt being in suitable proportion for controllably delaying the setting action of the preparation.

5. A process of preparing a pectin preparation in dry powdered form with the ingredients thereof homogeneously mixed together in suitable proportions to produce a jellied product suitable for making jellied candies and the like having a high percentage of soluble solid content by first mixing powdered pectin with a powdered sugar, then mixing therewith powdered $Na_2HPO_4$ and then mixing therewith a powdered edible organic acid, for the purpose of delaying the set of the finished product for a sufficient period of time to permit handling.

6. The method of producing a preparation consisting of a mixture of pectin, sugar, an edible organic acid and a salt of an alkaline metal and an acid stronger than the added acid in suitable proportions to produce a jellied product suitable for making jellied candies and the like having a higher percentage of soluble solid content than used to produce commercial preservers' jellies by mixing sugar with such proportion of pectin as to make a mixture having less jell units than used to produce commercial preservers' jellies, then adding the salt, and then adding the acid.

7. A pectin mixture for use for preparing jellied candies and the like having high percentage of soluble solid contents, comprising about 271 parts by weight of dry fine granulated corn sugar, about 100 parts by weight of No. 100 grade dry powdered pectin, about 18 parts by weight of a dry powdered salt of an alkaline metal and an acid stronger than the added free acid, such as di-sodium hydrogen phosphate, and about 10 to 20 parts by weight of an edible dry powdered organic acid, such as citric, tartaric, or malic, said salt being in the proportion suitable to controllably delay the setting action of the mixture.

8. A method of producing a preparation suitable for making jellied products having a higher soluble solid content than used to produce commercial preservers' jellies, comprising mixing suitable proportions of pectin, sugar, and an edible organic acid, the proportion of the added pectin being such to have less jell units than used to produce commercial preservers' jellies, and adding a dibasic acid phosphate in such proportion as to controllably delay the setting action of the preparation.

9. A preparation in dry powdered form for making food products comprising in suitable proportions to produce a jellied product suitable for making jellied candies and the like having a high percentage of soluble solid content, powdered pectin, sugar, a salt of an alkaline metal and an acid in dry powdered form, and a free acid also in dry powdered form and weaker than the acid component of the salt, said salt being in suitable proportion for controllably delaying the setting action of the preparation.

10. A preparation in dry powdered form for making food products which is readily dissolved in water and containing in suitable proportions to produce a jellied product suitable for making jellied candies and the like having a high percentage of soluble solid content, dry powdered pectin mixed with sugar, a dry powdered salt of an alkaline metal and an acid, and a dry powdered edible organic acid, the acid component of the salt being stronger than said organic acid, said salt being in suitable proportion for controllably delaying the setting action of the preparation.

11. A preparation in dry powdered form containing in suitable proportions to produce a jellied product suitable for making jellied candies and the like having a high percentage of soluble solid content, dry powdered pectin, sugar, a dry powdered edible organic acid and a dry powdered check in suitable proportion for retarding the jelling action of the mixture sufficient for pouring the jelly batch made therewith before setting, said check consisting of a dibasic acid phosphate.

12. A preparation in dry powdered form for making a jelly product suitable for making jellied candies and the like having a high percentage of soluble solid content, comprising a mixture of dry powdered pectin, sugar, a salt of an alkaline metal and an acid in dry powdered form and in proportion sufficient for cooking the jelly batch made with the preparation at a temperature above the boiling point of water for an hour or more without affecting the jell strength of the pectin component used and for delaying the setting action of the batch for thirty minutes or more, and a dry powdered edible organic acid in an amount suitable to effect a setting of the batch into the desired finished product, and of a strength insufficient to convert the acid component of said salt into an acid.

13. A dry powdered pectin preparation with which a pectin jelly candy and the like with a high percentage of soluble solid content may be produced, comprising in suitable proportions to produce the same, dry powdered pectin, sugar, a dry powdered salt of an alkaline metal and an acid component stronger than the free acid added to act as a check for the time of setting of the final product, and a dry powdered edible organic acid.

14. A preparation in dry powdered form for use in preparing pectin, jellied candies and the like having a high percentage of soluble solid contents, comprising from 89 to 112 parts by weight of dry powdered pectin of such a strength that a pound of the pectin mixture will have 25 jell units, from 14 to 20 parts by weight of a dry powdered salt of an alkaline metal and an acid stronger than the added acid, such as di-sodium hydrogen phosphate, from 10 to 20 parts by weight of a dry powdered edible organic acid, and the balance in sugar to make a total amount of mixture of 400 parts by weight, the phosphate component being in such proportion as to controllably delay the setting action of the preparation.

POWELL WILLIAMS.
JOHN D. WAUGH.